United States Patent
Duan et al.

(10) Patent No.: US 12,541,825 B2
(45) Date of Patent: Feb. 3, 2026

(54) MODEL TRAINING METHOD, IMAGE PROCESSING METHOD, COMPUTING AND PROCESSING DEVICE AND NON-TRANSIENT COMPUTER-READABLE MEDIUM

(71) Applicant: BOE Technology Group Co., Ltd., Beijing (CN)

(72) Inventors: Ran Duan, Beijing (CN); Guannan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 281 days.

(21) Appl. No.: 17/928,087

(22) PCT Filed: Oct. 28, 2021

(86) PCT No.: PCT/CN2021/127078
§ 371 (c)(1),
(2) Date: Nov. 28, 2022

(87) PCT Pub. No.: WO2023/070447
PCT Pub. Date: May 4, 2023

(65) Prior Publication Data
US 2024/0233313 A1 Jul. 11, 2024

(51) Int. Cl.
*G06T 5/73* (2024.01)
*G06T 5/20* (2006.01)
(Continued)

(52) U.S. Cl.
CPC .................. *G06T 5/73* (2024.01); *G06T 5/20* (2013.01); *G06T 5/60* (2024.01); *G06T 7/11* (2017.01);
(Continued)

(58) Field of Classification Search
CPC .... G06V 10/44; G06V 10/771; G06V 10/806; G06V 40/1318; G06V 40/1359;
(Continued)

(56) References Cited

U.S. PATENT DOCUMENTS 11,875,510 B2 * 1/2024 Wang ..................... G06N 3/044
2020/0311374 A1 10/2020 Kim et al.
(Continued)

FOREIGN PATENT DOCUMENTS

CN 108376387 A 8/2018
CN 109196523 A 1/2019
(Continued)

OTHER PUBLICATIONS

Adiga V, Sukesh, and Jayanthi Sivaswamy. "Fpd-m-net: Fingerprint image denoising and inpainting using m-net based convolutional neural networks." Inpainting and denoising challenges. Springer International Publishing, 2019. (Year: 2019).*
(Continued)

*Primary Examiner* — Stephen R Koziol
*Assistant Examiner* — Dylan J Sherrillo
(74) *Attorney, Agent, or Firm* — WHDA, LLP

(57) ABSTRACT

A model training method includes: acquiring a sample set, wherein samples in the sample set include a blurred image and a sharp image of a same fingerprint; inputting the blurred image into a convolutional neural network, performing, by an encoding network in the convolutional neural network, down-sampling and feature extraction to the blurred image, to output a plurality of feature maps, and performing, by a decoding network in the convolutional neural network, up-sampling and feature extraction to the feature maps, to output a predicted image corresponding to the blurred image; according to the predicted image, the sharp image and a predetermined loss function, calculating
(Continued)

a loss value of the convolutional neural network, and, with minimizing the loss value as a target, adjusting parameters of the convolutional neural network; and determining the convolutional neural network of which the parameters are adjusted to be an image processing model.

13 Claims, 7 Drawing Sheets

(51) Int. Cl.
| | |
|---|---|
| *G06T 5/60* | (2024.01) |
| *G06T 7/11* | (2017.01) |
| *G06T 7/13* | (2017.01) |
| *G06V 10/44* | (2022.01) |
| *G06V 10/771* | (2022.01) |
| *G06V 10/80* | (2022.01) |

(52) U.S. Cl.
CPC ................ *G06T 7/13* (2017.01); *G06V 10/44* (2022.01); *G06V 10/771* (2022.01); *G06V 10/806* (2022.01)

(58) Field of Classification Search
CPC .. G06V 10/82; G06T 5/20; G06T 5/73; G06T 7/11; G06T 7/13; G06T 2207/20084; G06T 5/60; G06N 3/08
See application file for complete search history.

(56) References Cited

U.S. PATENT DOCUMENTS

| | | | |
|---|---|---|---|
| 2021/0158490 A1* | 5/2021 | Tran | .................... G06N 3/0455 |
| 2021/0216739 A1 | 7/2021 | Li et al. | |

FOREIGN PATENT DOCUMENTS

| | | | | |
|---|---|---|---|---|
| CN | 110785768 A | | 2/2020 | |
| CN | 112102177 A | * | 12/2020 | ............. G06N 3/045 |
| CN | 113538359 A | | 10/2021 | |

OTHER PUBLICATIONS

Wu, Jiaqi, et al. "Convolutional neural network with Squeeze and Excitation modules for image blind deblurring." 2020 Information Communication Technologies Conference (ICTC). IEEE, 2020. (Year: 2020).*

Wu, J., et al., IEEE, 2020 Information Communications Techologies Conference, "Convolutional Neural Network with Squeeze and Excitation Modules for Image Blind Deblurring", pp. 338-345, Jun. 30, 2020.

* cited by examiner

MODEL TRAINING METHOD, IMAGE PROCESSING METHOD, COMPUTING AND PROCESSING DEVICE AND NON-TRANSIENT COMPUTER-READABLE MEDIUM

TECHNICAL FIELD

The present disclosure relates to the technical field of computers, and particularly relates to a model training method, an image processing method, a computing and processing device and a non-transient computer-readable medium.

BACKGROUND

The fingerprint under optical screen refers to illuminating a finger by using an under-screen pointolite, and the light rays are reflected by the finger and then received by an optical sensor under the screen. Because the intensities of the light rays reflected by the fingerprint troughs are different from the intensities of the light rays reflected by the fingerprint ridges, a fingerprint image can be generated. Because the fingerprint under optical screen collecting system has a large collection area, and a low hardware cost, it has a high productive value.

SUMMARY

The present disclosure provides a model training method, wherein the model training method includes:
acquiring a sample set, wherein samples in the sample set include a blurred image and a sharp image of a same fingerprint;
inputting the blurred image into a convolutional neural network, performing, by an encoding network in the convolutional neural network, down-sampling and feature extraction to the blurred image, to output a plurality of feature maps, and performing, by a decoding network in the convolutional neural network, up-sampling and feature extraction to the feature maps, to output a predicted image corresponding to the blurred image, wherein the encoding network includes a plurality of encoding hierarchies, the decoding network includes a plurality of decoding hierarchies, a feature map obtained from processing by using an F-th encoding hierarchy in the encoding network and a feature map obtained from processing by using a G-th decoding hierarchy in the decoding network are fused as an input of a (G+1)-th decoding hierarchy in the decoding network, a resolution of the feature map obtained from processing by using the F-th encoding hierarchy is the same as a resolution of the feature map obtained from processing by using the G-th decoding hierarchy, and both of F and G are a positive integer;
according to the predicted image, the sharp image and a predetermined loss function, calculating a loss value of the convolutional neural network, and, with minimizing the loss value as a target, adjusting parameters of the convolutional neural network; and
determining the convolutional neural network of which the parameters are adjusted to be an image processing model.
In an alternative implementation, each of the encoding hierarchies includes a first convolution block and/or a down-sampling block, and each of the decoding hierarchies includes a second convolution block and/or an up-sampling block; and
at least one of the first convolution block, the down-sampling block, the second convolution block and the up-sampling block includes at least one group of asymmetrical convolution kernels.

In an alternative implementation, the encoding network includes N encoding modules, each of the encoding modules includes M encoding hierarchies, both of M and N are a positive integer, and the step of performing, by the encoding network in the convolutional neural network, down-sampling and feature extraction to the blurred image, to output the plurality of feature maps includes:
performing, by a first encoding hierarchy of a first encoding module of the N encoding modules, feature extraction to the blurred image;
sequentially performing, by an i-th encoding hierarchy of the first encoding module, down-sampling and feature extraction to a feature map obtained from processing by using an (i−1)-th encoding hierarchy of the first encoding module, wherein i is greater than or equal to 2, and less than or equal to M;
performing, by a first encoding hierarchy of a j-th encoding module of the N encoding modules, feature extraction to a feature map obtained from processing by using a first encoding hierarchy of a (j−1)-th encoding module, wherein j is greater than or equal to 2, and less than or equal to N; and
by an i-th encoding hierarchy of the j-th encoding module, performing down-sampling to a feature map obtained from processing by using an (i−1)-th encoding hierarchy of the j-th encoding module, fusing a feature map obtained by the down-sampling and a feature map obtained from processing by using an i-th encoding hierarchy of the (j−1)-th encoding module, and performing feature extraction to a result of a fusion;
wherein the plurality of feature maps include feature maps obtained from processing by using the encoding hierarchies of a N-th encoding module of the N encoding modules.

In an alternative implementation, the decoding network includes M decoding hierarchies, and the step of performing, by the decoding network in the convolutional neural network, up-sampling and feature extraction to the feature maps, to output the predicted image corresponding to the blurred image includes:
by a first decoding hierarchy of the M decoding hierarchies, performing feature extraction to a feature map obtained from processing by using an M-th encoding hierarchy of the N-th encoding module, and performing up-sampling to a feature map obtained by the extraction;
fusing a feature map obtained from processing by using a (u−1)-th decoding hierarchy of the M decoding hierarchies and a feature map obtained from processing by using an (M−u+1)-th encoding hierarchy of the N-th encoding module, to obtain a first fused feature map, wherein u is greater than or equal to 2, and less than or equal to M−1;
inputting the first fused feature map into a u-th decoding hierarchy of the M decoding hierarchies, and sequentially performing, by the u-th decoding hierarchy, feature extraction and up-sampling to the first fused feature map;
fusing a feature map obtained from processing by using an (M−1)-th decoding hierarchy of the M decoding hierarchies and a feature map obtained from processing by using the first encoding hierarchy of the N-th encoding module, to obtain a second fused feature map; and inputting the second fused feature map into an M-th decoding hierarchy of the M decoding hierarchies, and performing, by the M-th decoding hierarchy, feature extraction to the second fused feature map, to obtain the predicted image.

In an alternative implementation, the step of fusing the feature map obtained by the down-sampling and the feature map obtained from processing by using the i-th encoding hierarchy of the (j−1)-th encoding module, and performing feature extraction to the result of the fusion includes:

splicing, in a channel dimension, the feature map obtained by the down-sampling and the feature map obtained from processing by using the i-th encoding hierarchy of the (j−1)-th encoding module, and performing feature extraction to a result of the splicing;

the step of fusing the feature map obtained from processing by using the (u−1)-th decoding hierarchy of the M decoding hierarchies and the feature map obtained from processing by using the (M−u+1)-th encoding hierarchy of the N-th encoding module, to obtain the first fused feature map includes:

splicing, in the channel dimension, the feature map obtained from processing by using the (u−1)-th decoding hierarchy of the M decoding hierarchies and the feature map obtained from processing by using the (M−u+1)-th encoding hierarchy of the N-th encoding module, to obtain the first fused feature map; and the step of fusing the feature map obtained from processing by using the (M−1)-th decoding hierarchy of the M decoding hierarchies and the feature map obtained from processing by using the first encoding hierarchy of the N-th encoding module, to obtain the second fused feature map includes:

splicing in a channel dimension the feature map obtained from processing by using the (M−1)-th decoding hierarchy of the M decoding hierarchies and the feature map obtained from processing by using the first encoding hierarchy of the N-th encoding module, to obtain the second fused feature map.

In an alternative implementation, each of the first convolution block and the second convolution block includes a first convolutional layer and a second convolutional layer, the first convolutional layer includes the asymmetrical convolution kernels, and the second convolutional layer includes a 1×1 convolution kernel;

the down-sampling block includes a maximum pooling layer and a minimum pooling layer, and each of the maximum pooling layer and the minimum pooling layer includes the asymmetrical convolution kernels; and the asymmetrical convolution kernels include 1×k convolution kernels and k×1 convolution kernels, wherein k is greater than or equal to 2.

In an alternative implementation, all of convolution kernels in the encoding hierarchies and the decoding hierarchies are symmetrical convolution kernels.

In an alternative implementation, the encoding network includes P encoding hierarchies, and the step of performing, by the encoding network in the convolutional neural network, down-sampling and feature extraction to the blurred image, to output the plurality of feature maps includes:

sequentially performing, by a first encoding hierarchy of the P encoding hierarchies, feature extraction and down-sampling to the blurred image; and sequentially performing, by a q-th encoding hierarchy of the P encoding hierarchies, feature extraction and down-sampling to a feature map obtained from processing by using a (q−1)-th encoding hierarchy;

wherein q is greater than or equal to 2, and less than or equal to P, and the plurality of feature maps include feature maps obtained from processing by using the P encoding hierarchies.

In an alternative implementation, the decoding network includes P decoding hierarchies, and the step of performing, by the decoding network in the convolutional neural network, up-sampling and feature extraction to the feature maps, to output the predicted image corresponding to the blurred image includes:

performing feature extraction to a feature map obtained from processing by using a P-th encoding hierarchy of the P encoding hierarchies, to obtain a calculation feature map;

fusing the calculation feature map and the feature map obtained from processing by using the P-th encoding hierarchy, to obtain a third fused feature map;

inputting the third fused feature map into a first decoding hierarchy of the P decoding hierarchies, and sequentially performing, by the first decoding hierarchy, up-sampling and feature extraction to the third fused feature map;

fusing a feature map obtained from processing by using a (r−1)-th decoding hierarchy of the P decoding hierarchies and a feature map obtained from processing by using a (P−r+1)-th encoding hierarchy of the P encoding hierarchies, to obtain a fourth fused feature map; and inputting the fourth fused feature map into an r-th decoding hierarchy of the P decoding hierarchies, and sequentially performing, by the r-th decoding hierarchy, up-sampling and feature extraction to the fourth fused feature map;

wherein r is greater than or equal to 2, and less than or equal to P, and the predicted image is a feature map obtained from processing by using a P-th decoding hierarchy of the P decoding hierarchies.

In an alternative implementation, the step of fusing the calculation feature map and the feature map obtained from processing by using the P-th encoding hierarchy, to obtain the third fused feature map includes:

splicing in a channel dimension the calculation feature map and the feature map obtained from processing by using the P-th encoding hierarchy, to obtain the third fused feature map; and the step of fusing the feature map obtained from processing by using the (r−1)-th decoding hierarchy of the P decoding hierarchies and the feature map obtained from processing by using the (P−r+1)-th encoding hierarchy of the P encoding hierarchies, to obtain the fourth fused feature map includes:

splicing in a channel dimension the feature map obtained from processing by using the (r−1)-th decoding hierarchy of the P decoding hierarchies and the feature map obtained from processing by using the (P−r+1)-th encoding hierarchy of the P encoding hierarchies, to obtain the fourth fused feature map.

In an alternative implementation, the step of, according to the predicted image, the sharp image and the predetermined loss function, calculating the loss value of the convolutional neural network includes:

calculating the loss value by using the following formulas:

$$L(Y, \hat{Y}) = L_{L1}(Y, \hat{Y}) + \lambda \times L_{sobel}(Y, \hat{Y}),$$

$$L_{L1}(Y, \hat{Y}) = \frac{1}{W \times H \times C} \sum_{x=1}^{W} \sum_{y=1}^{H} \sum_{z=1}^{C} |Y_{(x,y,z)} - \hat{Y}_{(x,y,z)}|,$$

$$L_{sobel}(Y, \hat{Y}) = L_{L1}(E(Y), E(\hat{Y})),$$

wherein $L(Y, \hat{Y})$ is the loss value, Y is the predicted image, $\hat{Y}$ is the sharp image, W is a width of the predicted image, H is a height of the predicted image, C is a channel quantity of the predicted image, E(Y) is an edge image of the predicted image, $E(\hat{Y})$ is an edge image of the sharp image, $\lambda$ is greater than or equal to 0, and less than or equal to 1, x is a positive integer greater than or equal to 1 and less than or equal to W, y is a positive integer greater than or equal to 1 and less than or equal to H, and z is a positive integer greater than or equal to 1 and less than or equal to C.

In an alternative implementation, the step of acquiring the sample set includes:

acquiring an original image of the same fingerprint; and pre-processing the original image, to obtain the blurred image, wherein the pre-processing includes at least one of image segmentation, size cutting, flipping, brightness enhancement, noise processing and normalization processing.

In an alternative implementation, the step of pre-processing the original image, to obtain the blurred image includes:

performing image segmentation to the original image, to obtain a first image, a second image and a third image, wherein the first image, the second image and the third image contain data of different regions of the original image; and performing normalization processing individually to the first image, the second image and the third image, wherein the blurred image includes the first image, the second image and the third image that are obtained after the normalization processing.

In an alternative implementation, the original image includes a first pixel value of a first pixel, and the step of performing image segmentation to the original image, to obtain the first image, the second image and the third image includes:

if the first pixel is located outside a predetermined region area, and the first pixel value is greater than or equal to a first threshold, and less than or equal to a second threshold, determining a pixel value of the first pixel in the first image to be the first pixel value;

if the first pixel is located outside the predetermined region area, and the first pixel value is less than the first threshold, and greater than the second threshold, determining the pixel value of the first pixel in the first image to be 0;

if the first pixel is located outside the predetermined region area, and the first pixel value is greater than or equal to a third threshold, and less than or equal to a fourth threshold, determining a pixel value of the first pixel in the second image to be the first pixel value;

if the first pixel is located outside the predetermined region area, and the first pixel value is less than the third threshold, and greater than the fourth threshold, determining the pixel value of the first pixel in the second image to be 0; and if the first pixel is located inside the predetermined region area, determining a pixel value of the first pixel in the third image to be the first pixel value;

wherein the third threshold is greater than the second threshold.

In an alternative implementation, the step of performing image segmentation to the original image, to obtain the first image, the second image and the third image includes:

performing edge detection to the original image, and according to a position and a length of a detected edge, segmenting the original image into the first image, the second image and the third image.

In an alternative implementation, the step of performing normalization processing individually to the first image, the second image and the third image includes:

determining a maximum value and a minimum value of all of pixel values contained in an image to be processed, wherein the image to be processed is any one of the first image, the second image and the third image, and the image to be processed contains a second pixel value of a second pixel; and according to the maximum value, the minimum value and the second pixel value, determining a pixel value of the second pixel in the image to be processed that is obtained after the normalization processing.

The present disclosure provides an image processing method, wherein the image processing method includes:

acquiring a blurred fingerprint image; and inputting the blurred fingerprint image into an image processing model that is obtained by training by using the model training method according to any one of the above embodiments, to obtain a sharp fingerprint image corresponding to the blurred fingerprint image.

In an alternative implementation, on the condition that the blurred image is a result of pre-processing to the original image, the step of acquiring the blurred fingerprint image includes:

acquiring an original fingerprint image; and pre-processing the original fingerprint image, to obtain the blurred fingerprint image, wherein the pre-processing includes at least one of image segmentation, size cutting, flipping, brightness enhancement, noise processing and normalization processing.

The present disclosure provides a computing and processing device, wherein the computing and processing device includes:

a memory storing a computer-readable code; and one or more processors, wherein when the computer-readable code is executed by the one or more processors, the computing and processing device implements the method according to any one of the above embodiments.

The present disclosure provides a non-transient computer-readable medium, wherein the non-transient computer-readable medium stores a computer-readable code, and when the computer-readable code is executed in a computing and processing device, the computer-readable code causes the computing and processing device to implement the method according to any one of the above embodiments.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are embodiments of the present disclosure, and a person skilled in the art can obtain other figures according to these figures without paying creative work. It should be noted that the proportions in the drawings are merely illustrative and do not indicate the actual proportions.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
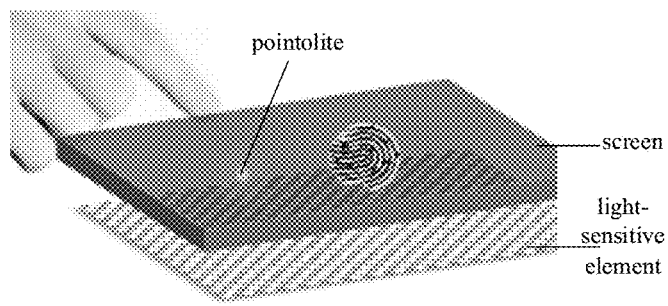
FIG. 1 schematically shows a schematic diagram of the collection of an image of fingerprints under optical screen.

As shown in FIG. 1, the fingerprint under optical screen refers to illuminating a finger by using an under-screen pointolite, and the light rays are reflected by the finger and then received by a light-sensitive element under the screen. Because the intensities of the light rays reflected by the fingerprint troughs are different from the intensities of the light rays reflected by the fingerprint ridges, a fingerprint image can be generated.

Figure 2:
FIG. 2 schematically shows a schematic diagram of a multi-pointolite imaging solution.

In the related art, usually a plurality of pointolites under the screen are simultaneously lightened, to obtain a fingerprint image of a larger area and a higher intensity. However, as restricted by the principles of the light emission and the imaging of the pointolites, no matter how the positions of the pointolites are arranged, an ideal fingerprint image cannot be obtained. As shown in FIG. 2, when the plurality of pointolites are arranged sparsely, the fingerprint images corresponding to the pointolites are too scattered, and cannot be spliced into a complete fingerprint image. In order to obtain a complete fingerprint image, the plurality of pointolites are required to be arranged densely, which causes that the fingerprint images corresponding to the pointolites overlap with each other.

In the related art, in order to obtain a clear fingerprint image, the method may also include sequentially lightening the pointolites, individually collecting the fingerprint images corresponding to each of the single pointolites, and subsequently performing cutting, aligning, splicing and so on to the fingerprint images corresponding to the plurality of single pointolites, to obtain a complete and clear fingerprint image. However, such a solution requires collecting the fingerprint images corresponding to each of the single pointolites, which has a long collecting duration and a poor feasibility.

Figure 3:
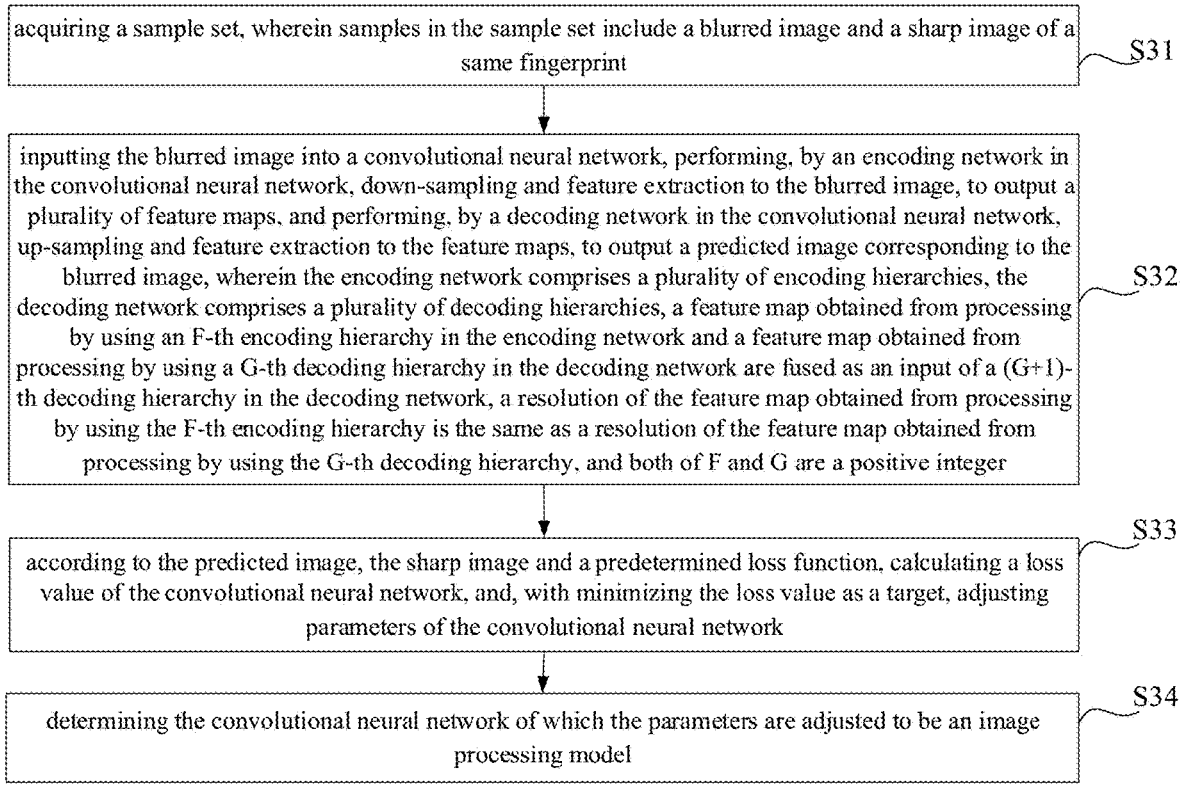
FIG. 3 schematically shows a schematic flow chart of a model training method.

In order to solve the above problem, FIG. 3 schematically shows a flow chart of a model training method. As shown in FIG. 3, the method may include the following steps.

Step S31: acquiring a sample set, wherein samples in the sample set include a blurred image and a sharp image of a same fingerprint.

The subject of the implementation of the present embodiment may be a computer device. The computer device has a model training apparatus which may be used to implement the model training method according to the present embodiment. The computer device may, for example, be a smartphone, a tablet personal computer and a personal computer, which is not limited in the present embodiment.

The subject of the implementation of the present embodiment may acquire the sample set in various manners. For example, the subject of the implementation may, by means of wired connection or wireless connection, acquire, from another server for storing data (for example, a database server), the samples stored therein. As another example, the subject of the implementation may acquire samples collected by an under-screen fingerprint collecting device and so on, and store those samples locally, thereby generating the sample set.

Figure 4:
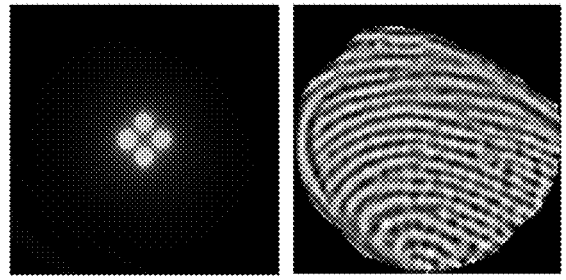
FIG. 4 schematically shows a group of an original image and a sharp image.

In a particular implementation, a plurality of pointolites may be lightened simultaneously on the under-screen fingerprint collecting device, to perform multiple times of collection on different fingers of the person participating in the fingerprint collection, and, by using an imaging module in the device, the original image is generated, as shown in the left figure in FIG. 4. The original image may, for example, be a 16-bit image in the format of png.

The blurred image may be the original image directly generated by the under-screen fingerprint collecting device, and may also be an image obtained by pre-processing the original image, which is not limited in the present disclosure.

The left figure and the right figure in FIG. 4 show the original image and the sharp image of the same fingerprint respectively. In the present embodiment, both of the original image and the sharp image may be grayscale images of a single channel. In practical applications, the original image and the sharp image may also be multichannel color images, for example, RGB images.

Figure 5:
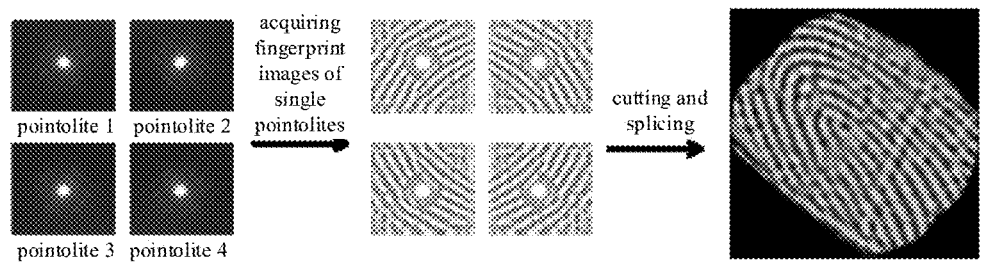
FIG. 5 schematically shows a schematic flow chart of the collection of a sharp image.

Referring to FIG. 5, FIG. 5 shows a schematic flow chart of the obtaining of the sharp image. As shown in FIG. 5, the process may include, simultaneously lightening a plurality of pointolites, collecting an initial image of a certain fingerprint (for example, a hand fingerprint), subsequently ensuring that the finger of the person to be collected maintains not moving on the screen, subsequently sequentially lightening the pointolites, and acquiring fingerprint image corresponding to each of the pointolites, and cutting and splicing the fingerprint images corresponding to the plurality of single pointolites, to finally obtain the sharp image of the fingerprint. FIG. 5 shows 4 pointolites, which are a pointolite 1, a pointolite 2, a pointolite 3 and a pointolite 4. The 4 pointolites are sequentially lightened, to obtain 4 fingerprint images corresponding to the single pointolites, and the 4 fingerprint images corresponding to the single pointolites are cut and spliced to obtain one sharp image.

In an alternative implementation, the step S31 may particularly include: firstly, acquiring an original image of the same fingerprint; and subsequently, pre-processing the original image, to obtain the blurred image, wherein the pre-processing includes at least one of image segmentation, size cutting, flipping, brightness enhancement, noise processing and normalization processing.

In the present implementation, the blurred image is an image obtained by pre-processing the original image.

Figure 6:
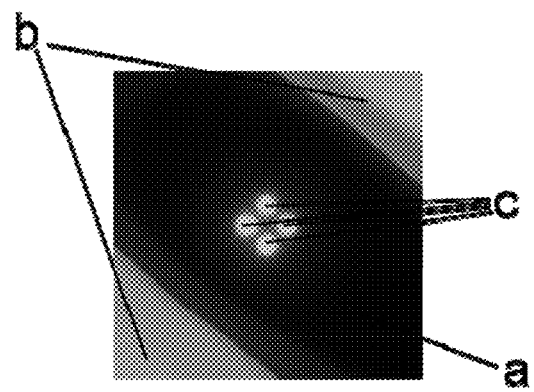
FIG. 6 schematically shows a schematic diagram of a blurred image.

As shown in FIG. 6, the original image acquired by simultaneously lightening the plurality of pointolites does not only contain the fingerprint data generated by receiving the reflected light of the fingerprint by a light-sensitive element (located at the region a in FIG. 6), but also has the noise data introduced by the surrounding ambient light (located at the region b in FIG. 6) and the light data adjacent to the pointolites (located at the region c in FIG. 6). The region a contains the main fingerprint data, the region b has a large amount of ambient light noise and a small quantity of slight fingerprint data, and the region c has intensive light-source signals and a small amount of fingerprint data. Before the training of the convolutional neural network, the process may include, firstly, performing image segmentation to the original image, to obtain a first image corresponding to the region a (as shown by a in FIG. 7), a second image corresponding to the region b (as shown by b in FIG. 7) and a third image corresponding to the region c (as shown by c in FIG. 7).

The first image, the second image and the third image contain image data of different regions of the original image. By delimiting the original image into the first image, the second image and the third image according to the regions, separation between the primary data and the secondary data can be realized, to reduce the influence on the fingerprint image by the ambient light and the pointolites.

Figure 7:
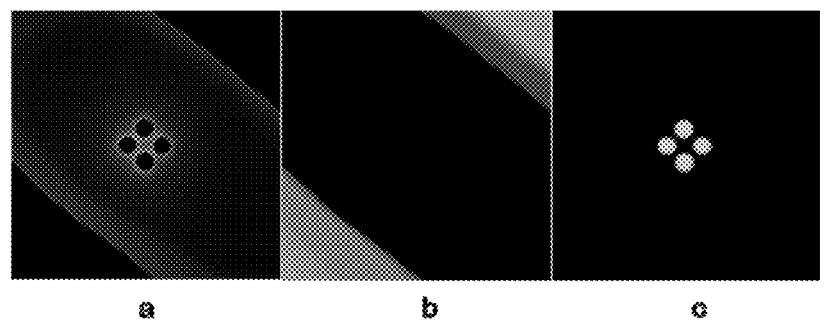
FIG. 7 schematically shows a schematic diagram of a first image, a second image and a third image.

Furthermore, the inventor further found that, when the value range of the pixel values is 0 to 65535, most of the pixel values of the pixels within the region a, which contains the primary fingerprint data, are distributed below 10000. In other words, the pixel values within the region a are mainly within the lower-numerical-value range, while the pixel values within the region b and, especially, the region c are within the higher-numerical-value range. Therefore, in order to acquire the fingerprint data within the region a to a larger extent, and prevent losing of the primary fingerprint data, the first image, the second image and the third image that are obtained by the image segmentation may individually undergo normalization processing. The a in FIG. 7 shows the first image obtained after the normalization processing, the b in FIG. 7 shows the second image obtained after the normalization processing, and the c in FIG. 7 shows the third image obtained after the normalization processing.

In the present embodiment, the blurred image includes the first image, the second image and the third image that are obtained after the normalization processing. Particularly, the blurred image may be a three-channel image obtained by splicing in a channel dimension the first image, the second image and the third image that are obtained after the normalization processing. By splicing the images of the different regions in a channel dimension, more effective fingerprint data can be extracted in multiple dimensions, to increase the accuracy of the subsequent fingerprint identification.

In a particular implementation, the image segmentation to the original image may employ a threshold segmentation method or an edge detection method, which is not limited in the present disclosure.

The original image includes a first pixel value of a first pixel. In a first implementation, the step of performing image segmentation to the original image, to obtain the first image, the second image and the third image may include:
  if the first pixel is located outside a predetermined region area, and the first pixel value is greater than or equal to a first threshold, and less than or equal to a second threshold, determining a pixel value of the first pixel in the first image to be the first pixel value;
  if the first pixel is located outside the predetermined region area, and the first pixel value is less than the first threshold, and greater than the second threshold, determining the pixel value of the first pixel in the first image to be 0;
  if the first pixel is located outside the predetermined region area, and the first pixel value is greater than or equal to a third threshold, and less than or equal to a fourth threshold, determining a pixel value of the first pixel in the second image to be the first pixel value;
  if the first pixel is located outside the predetermined region area, and the first pixel value is less than the third threshold, and greater than the fourth threshold, determining the pixel value of the first pixel in the second image to be 0;
  wherein the third threshold is greater than the second threshold; in other words, the pixel values of the region b are overall greater than the pixel values of the region a; and
  if the first pixel is located inside the predetermined region area, determining a pixel value of the first pixel in the third image to be the first pixel value.

Particularly, the first image corresponds to the region a, and the region a may be segmented from the original image by using the following formula.

$$I^a_{(x,y)} = \begin{cases} I_{(x,y)}, & \min_a \leq I_{(x,y)} \leq \max_a \\ 0, & I_{(x,y)} < \min_a \text{ or } I_{(x,y)} > \max_a \end{cases}$$

wherein $I_{(x,y)}^a$ represents the pixel value at the coordinate (x,y) in the first image, $I_{(x,y)}$ represents the pixel value at the coordinate (x,y) in the original image, min is the first threshold, and $\max_a$ is the second threshold.

The particular numerical values of the first threshold and the second threshold may be obtained by artificially selecting a relatively smooth region within the region a, counting up and calculating the pixel values of the original image within that region, and determining the minimum value of the region a and the maximum value of the region a. The first threshold may be the average value of the minimum values of the regions a of multiple original images. The second threshold may be the average value of the maximum values of the regions a of multiple original images.

It should be noted that the region a can be segmented from the original image by using the above formula, which is similar to image matting, and, in the first image, all of the pixel values of the region b and the region c are 0.

Particularly, the second image corresponds to the region b, and the region b may be segmented from the original image by using the following formula.

$$I_{(x,y)}^b = \begin{cases} I_{(x,y)}, & \min_b \leq I_{(x,y)} \leq \max_b \\ 0, & I_{(x,y)} < \min_b \text{ or } I_{(x,y)} > \max_b \end{cases}$$

wherein $I_{(x,y)}^b$ represents the pixel value at the coordinate (x,y) in the second image, $I_{(x,y)}$ represents the pixel value at the coordinate (x,y) in the original image, $\min_a$ is the third threshold, and $\max_b$ is the fourth threshold.

The particular numerical values of the third threshold and the fourth threshold may be obtained by artificially selecting a relatively smooth region within the region b, counting up and calculating the pixel values of the original image within that region, and determining the minimum value of the region b and the maximum value of the region b. The third threshold may be the average value of the minimum values of the regions b of multiple original images. The fourth threshold may be the average value of the maximum values of the regions b of multiple original images.

It should be noted that the region b can be segmented from the original image by using the above formula, which is similar to image matting, and, in the second image, all of the pixel values of the region a and the region c are 0.

The third image corresponds to the segmentation of the region c, which may be performed according to the positions of the pointolites in the fingerprint image. As the pointolites are fixed, the coordinates of the predetermined regions are also fixed, and the coordinates and the lightspot radii of the pointolites may be directly measured to determine the predetermined regions, to in turn realize the segmentation of the region c. In the third image, all of the pixel values of the region a and the region b are 0.

In a second implementation, the step of performing image segmentation to the original image, to obtain the first image, the second image and the third image may include: performing edge detection to the original image, and according to a position and a length of a detected edge, segmenting the original image into the first image, the second image and the third image.

In a particular implementation, a Laplace edge-detection algorithm may be used, to perform edge detection to the original image, screen the lengths and the positions of the detected edges, and use the finally extracted edges as the boundaries of the regions for the segmentation.

In a bright-state collecting environment, the Laplace edge-detection algorithm can detect the boundaries between the region a and the region b and the boundaries between the region a and the region c, and might also detect the boundaries caused by noise, the boundaries of the effective identifying region, and so on. Further, the boundaries caused by noise may be screened out according to the boundary lengths, and the boundaries of the effective identifying region may be screened out according to the boundary positions. Because edge detection has a high speed, by using the edge detection method for the image segmentation, the efficiency of the segmentation can be increased.

It is assumed that the image to be processed is any one of the first image, the second image and the third image, and the image to be processed contains a second pixel value of a second pixel. In a particular implementation, the step of performing normalization processing individually to the first image, the second image and the third image may include: firstly, determining a maximum value and a minimum value of all of pixel values contained in an image to be processed; and subsequently, according to the maximum value, the minimum value and the second pixel value, determining a pixel value of the second pixel in the image to be processed that is obtained after the normalization processing.

Particularly, the maximum value and the minimum value of all of the pixel values contained in the image to be processed may be calculated. It is assumed that the maximum value is max, the minimum value is min, and the second pixel value of the second pixel in the image to be processed is I, then, after the normalization, the pixel value of the second pixel is $I_{norm}=(I-\min)/(\max-\min)$. Accordingly, all of the pixel values in the image to be processed can be normalized into the numerical-value range of 0 to 1.

Step S32: inputting the blurred image into a convolutional neural network, performing, by an encoding network in the convolutional neural network, down-sampling and feature extraction to the blurred image, to output a plurality of feature maps, and performing, by a decoding network in the convolutional neural network, up-sampling and feature extraction to the feature maps, to output a predicted image corresponding to the blurred image, wherein the encoding network includes a plurality of encoding hierarchies, the decoding network includes a plurality of decoding hierarchies, a feature map obtained from processing by using an F-th encoding hierarchy in the encoding network and a feature map obtained from processing by using a G-th decoding hierarchy in the decoding network are fused as an input of a (G+1)-th decoding hierarchy in the decoding network, a resolution of the feature map obtained from processing by using the F-th encoding hierarchy is the same as a resolution of the feature map obtained from processing by using the G-th decoding hierarchy, and both of F and G are a positive integer.

The convolutional neural network (CNN) refers to a neural network architecture that uses, for example, images as the input and the output, and uses a filter (convolution kernel) to replace the scalar weight. The process of the convolution may be deemed as using a trainable filter to perform convolution to an inputted image or convolutional feature plane (feature map), and outputting a convolutional feature plane, wherein the convolutional feature plane may also be referred to as a feature map. The convolutional layer refers to the neuron layer in the convolutional neural network that performs the convolution processing to the inputted signal. In the convolutional layer of the convolutional neural network, one neuron is merely connected to some of the neurons in the neighboring layers. The convolutional layer may apply a plurality of convolution kernels to the inputted image, to extract multiple types of features of the inputted image. Each of the convolution kernels may extract one type of the features. The convolution kernels are usually initialized in the form of matrixes of random sizes, and in the training of the convolutional neural network, the convolution kernels obtain reasonable weight values by learning. In the same convolutional layer, a plurality of convolution kernels may be configured to extract different image data.

By, after the feature map obtained from processing by using the F-th encoding hierarchy in the encoding network and the feature map obtained from processing by using the G-th decoding hierarchy in the decoding network are fused, inputting it into the (G+1)-th decoding hierarchy in the decoding network, skip connection between the encoding network and the decoding network can be realized. By using the skip connection between the encoding network and the decoding network, the reservation of the image details by the decoding network may be increased, and the image details and the data that are lost in the down-sampling of the encoding network may be transmitted to the decoding network, whereby, in the process of the decoding network recovering the spatial resolution in the up-sampling, those data can be used to generate a more accurate image, thereby increasing the accuracy of extracting the sharp image from the blurred image.

The down-sampling operations may include: maximum-value combination, average-value combination, random combination, undersampling (for example, selecting fixed pixels), demultiplexing outputting (for example, splitting the inputted image into a plurality of smaller images), and so on, which is not limited in the present disclosure.

The up-sampling operations may include: maximum-value combination, stride transposed convolution, interpolation and so on, which is not limited in the present disclosure.

In the encoding network, the down-sampling may be performed multiple times, which can gradually reduce the spatial dimensions of the feature maps and can expand the receptive field, whereby the encoding network can better extract local and global features of different scales. Furthermore, the down-sampling may compress the extracted feature maps, thereby saving the calculation amount and the memory occupation, and increasing the processing speed.

In the decoding network, the spatial resolution of a plurality of feature maps outputted by the encoding network may be recovered to be equal to that of the blurred image by multiple times of up-sampling.

Step S33: according to the predicted image, the sharp image and a predetermined loss function, calculating a loss value of the convolutional neural network, and, with minimizing the loss value as a target, adjusting parameters of the convolutional neural network.

The loss function is an important equation for measuring the difference between the predicted image and the sharp image. For example, if the output value (loss) of the loss function is higher, that indicates a higher difference.

In an alternative implementation, the loss value of the convolutional neural network may be calculated by using the following formulas:

$$L(Y, \hat{Y}) = L_{L1}(Y, \hat{Y}) + \lambda \times L_{sobel}(Y, \hat{Y}),$$

$$L_{L1}(Y, \hat{Y}) = \frac{1}{W \times H \times C} \sum_{x=1}^{W} \sum_{y=1}^{H} \sum_{z=1}^{C} |Y_{(x,y,z)} - \hat{Y}_{(x,y,z)}|,$$

$$L_{sobel}(Y, \hat{Y}) = L_{L1}(E(Y), E(\hat{Y})),$$

wherein L(Y, Ŷ) is the loss value, Y is the predicted image, Ŷ is the sharp image, W is a width of the predicted image, H is a height of the predicted image, C is a channel quantity of the predicted image, E(Y) is an edge image of the predicted image, E(Ŷ) is an edge image of the sharp image, λ is greater than or equal to 0 and less than or equal to 1, x is a positive integer greater than or equal to 1 and less than or equal to W, y is a positive integer greater than or equal to 1 and less than or equal to H, and z is a positive integer greater than or equal to 1 and less than or equal to C.

E(Y) may be the edge image of the predicted image that is acquired by using a Sobel edge-extraction algorithm, and E(Ŷ) may be the edge image of the sharp image that is acquired by using a Sobel edge-extraction algorithm.

Because $L_{L1}(Y, \hat{Y})$ can guide the network to recover the low-frequency data of the sharp image, and $L_{sobel}(Y, \hat{Y})$ facilitates to enhance the edge data of the original image, in the present implementation, by using the weighted sum of $L_{L1}(Y, \hat{Y})$ and $L_{sobel}(Y, \hat{Y})$ as the loss function, the effect of the image extraction may be improved.

In a particular implementation, the parameters of the convolutional neural network may be optimized according to the loss value by using an AdamW optimizer. The initial learning rate may be set to be $10^{-4}$, and the batch size of the training data may be set to be 48.

In a particular implementation, whether to end the training may be determined by determining whether the convolutional neural network converges, wherein the determination on whether the convolutional neural network converges may be performed by any one of the following modes: determining whether the time quantity of the updating of the parameters of the convolutional neural network reaches an iteration threshold; or determining whether the loss value of the convolutional neural network is less than a loss threshold. The iteration threshold may be a preset iteration time quantity. For example, if the time quantity of the updating of the parameters of the convolutional neural network is greater than the iteration threshold, then the training is ended. The loss threshold may be preset. For example, if the loss value obtained by calculating by using the loss function is less than the loss threshold, then the training is ended.

Step S34: determining the convolutional neural network of which the parameters are adjusted to be an image processing model.

In the present embodiment, in response to the determination that the training of the convolutional neural network is completed, the convolutional neural network that is trained may be determined to be the image processing model. The image processing model may be configured to extract a sharp fingerprint image from a blurred fingerprint image.

The model training method according to the present embodiment, by training the convolutional neural network, can obtain a model that can be configured to extract a sharp fingerprint image. The convolutional neural network according to the present embodiment includes the encoding network and the decoding network that have a skip connection, and, by using the skip connection between the encoding network and the decoding network, the reservation of the image details by the decoding network may be increased, thereby increasing the accuracy of extracting the sharp image from the blurred image, and improving the effect of the image processing.

In the present embodiment, the particular architecture of the convolutional neural network may be configured according to practical demands.

In an alternative implementation, each of the encoding hierarchies may include a first convolution block and/or a down-sampling block. The first convolution block is configured to perform feature extraction to the inputted characteristic matrix. The down-sampling block is configured to perform down-sampling to the inputted feature map.

Each of the decoding hierarchies may include a second convolution block and/or an up-sampling block. The second convolution block is configured to perform feature extraction to the inputted characteristic matrix. The up-sampling block is configured to perform up-sampling to the inputted feature map.

At least one of the first convolution block, the down-sampling block, the second convolution block and the up-sampling block includes at least one group of asymmetrical convolution kernels.

The asymmetrical convolution kernels may, for example, include 1×k convolution kernels and k×1 convolution kernels, wherein the value of k is greater than or equal to 2. The value of k may be set according to demands, and may, for example, be 5.

In the present implementation, by using the asymmetrical convolution kernels to perform feature extraction or sampling processing, the calculation amount may be greatly reduced, thereby increasing the processing speed. By using the asymmetrical convolution kernels to perform transverse convolution and longitudinal convolution, the transverse gradient and the longitudinal gradient in the image may be learnt respectively, which facilitates to extract the changing of the data in the fingerprint image.

Figure 8:
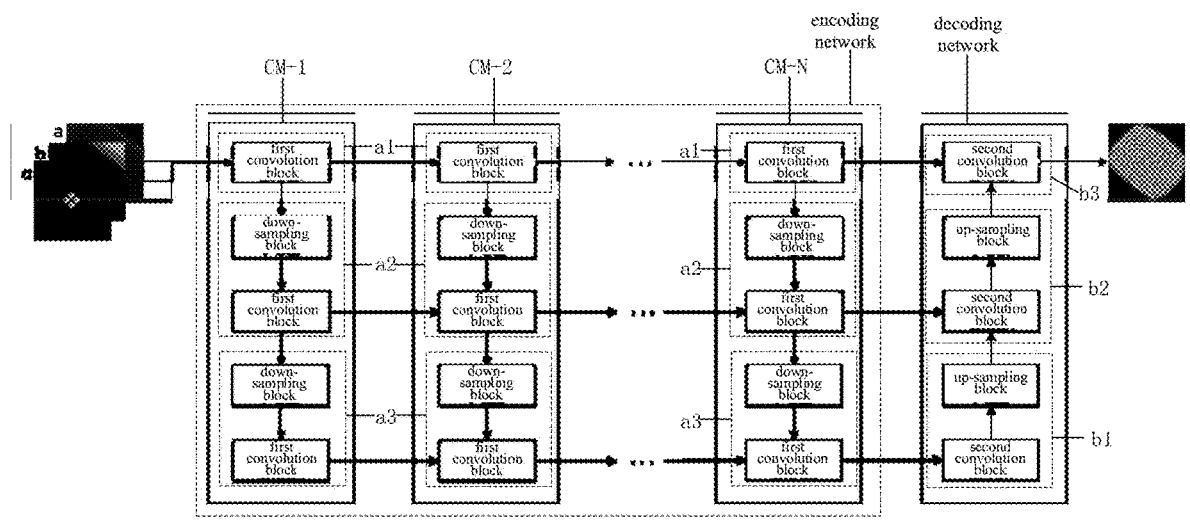
FIG. 8 schematically shows a schematic structural diagram of a first type of a convolutional neural network.

As shown in FIG. 8, the encoding network may include N encoding modules, for example, CM-1, CM-2, . . . and CM-N shown in FIG. 8, wherein N may be a positive integer, or N may be greater than or equal to 2 and less than or equal to 20. For example, the value of N may be 8, 10, 12, 15 and so on, and the particular numerical value of N is not limited in the present disclosure.

Each of the encoding modules may include M encoding hierarchies, wherein M may be a positive integer, or M may be greater than or equal to 2 and less than or equal to 8. For example, the M value shown in FIG. 8 is 3, which means that each of the encoding modules includes 3 encoding hierarchies, which are the first encoding hierarchy a1, the second encoding hierarchy a2 and the third encoding hierarchy a3. The particular numerical value of M is not limited in the present disclosure.

Particularly, the first encoding hierarchy a1 of any one of the encoding modules may include one or more first convolution blocks. The i-th encoding hierarchy of any one of the encoding modules may include one or more first convolution blocks and one down-sampling block, wherein i is greater than or equal to 2, and less than or equal to M.

The decoding network may include M decoding hierarchies; in other words, the quantity of the decoding hierarchies in the decoding network is equal to the quantity of the encoding hierarchies in each of the encoding modules. The decoding network shown in FIG. 8 includes three decoding hierarchies, which are the first decoding hierarchy b1, the second decoding hierarchy b2 and the third decoding hierarchy b3.

In the decoding network, each of the first decoding hierarchy to the (M−1)-th decoding hierarchy may include one or more second convolution blocks and one up-sampling block. The M-th decoding hierarchy may include one or more second convolution blocks.

Each of the encoding modules shown in FIG. 8 includes two down-sampling blocks, and each of the down-sampling blocks may perform 2-fold down-sampling to the inputted feature map. The decoding network includes two up-sampling blocks, and each of the up-sampling blocks may perform 2-fold up-sampling to the inputted feature map. That can ensure that the image outputted by the convolutional neural network and the image inputted into the convolutional neural network have equal resolutions.

In the present implementation, the step of performing, by the encoding network in the convolutional neural network, down-sampling and feature extraction to the blurred image, to output the plurality of feature maps may include:

performing, by the first encoding hierarchy a1 of the first encoding module CM-1 of the N encoding modules, feature extraction to the blurred image;

sequentially performing, by the i-th encoding hierarchy of the first encoding module CM-1, down-sampling and feature extraction to a feature map obtained from processing by using the (i−1)-th encoding hierarchy of the first encoding module;

performing, by the first encoding hierarchy of the j-th encoding module of the N encoding modules, feature extraction to a feature map obtained from processing by using the first encoding hierarchy of the (j−1)-th encoding module, wherein j is greater than or equal to 2, and less than or equal to N; and by the i-th encoding hierarchy of the j-th encoding module, performing down-sampling to a feature map obtained from processing by using the (i−1)-th encoding hierarchy of the j-th encoding module, fusing a feature map obtained by the down-sampling and a feature map obtained from processing by using the i-th encoding hierarchy of the (j−1)-th encoding module, and performing feature extraction to a result of the fusion.

The step of fusing the feature map obtained by the down-sampling and the feature map obtained from processing by using the i-th encoding hierarchy of the (j−1)-th encoding module, and performing feature extraction to the result of the fusion may include: splicing in a channel dimension the feature map obtained by the down-sampling and the feature map obtained from processing by using the i-th encoding hierarchy of the (j−1)-th encoding module, and performing feature extraction to a result of the splicing.

The blurred image may be an image obtained by splicing in a channel dimension the first image, the second image and the third image. In a particular implementation, the matrix dimension of the blurred image may be B×3×H×W, wherein B is the quantity of the original images in one training batch, H is the height of one original image, and W is the width of one original image. The outputted sharp image is a matrix of B×1×H×W.

In the first encoding module CM-1, optionally, the first convolution block in the first encoding hierarchy a1 performs feature extraction to the blurred image, to obtain a first feature map. The down-sampling block in the second encoding hierarchy a2 performs the first time of down-sampling to the first feature map, and the first convolution block in the second encoding hierarchy a2 performs feature extraction to the feature map obtained by the first time of down-sampling, to obtain a second feature map. The down-sampling block in the third encoding hierarchy a3 performs the second time of down-sampling to the second feature map, and the first convolution block in the third encoding hierarchy a3 performs feature extraction to the feature map obtained by the second time of down-sampling, to obtain a third feature map.

In the second encoding module CM-2, the first convolution block in the first encoding hierarchy a1 performs feature extraction to the first feature map outputted by the first encoding module CM-1. The down-sampling block in the second encoding hierarchy a2 performs the first time of down-sampling to the feature map outputted by the first encoding hierarchy a1, and the first convolution block in the second encoding hierarchy a2 performs feature fusion of the feature map obtained by the first time of down-sampling and the second feature map outputted by the first encoding module CM-1, and performs feature extraction to the result of the fusion. The down-sampling block in the third encoding hierarchy a3 performs the second time of down-sampling to the feature map outputted by the second encoding hierarchy a2, and the first convolution block in the third encoding hierarchy a3 performs feature fusion of the feature map obtained by the second time of down-sampling and the third feature map outputted by the first encoding module CM-1, and performs feature extraction to the result of the fusion.

It is assumed that, in the (N−1)-th encoding module CM-N-1, the feature map outputted by the first encoding hierarchy a1 is a fourth feature map, the feature map outputted by the second encoding hierarchy a2 is a fifth feature map, and the feature map outputted by the third encoding hierarchy a3 is a sixth feature map.

In the N-th encoding module CM-N, the first convolution block in the first encoding hierarchy a1 performs feature extraction to the fourth feature map outputted by the encoding module CM-N-1, to obtain a seventh feature map. The down-sampling block in the second encoding hierarchy a2 performs the first time of down-sampling to the feature map outputted by the first encoding hierarchy a1, and the first convolution block in the second encoding hierarchy a2 performs feature fusion of the feature map obtained by the first time of down-sampling and the fifth feature map outputted by the encoding module CM-N-1, and performs feature extraction to the result of the fusion, to obtain an eighth feature map. The down-sampling block in the third encoding hierarchy a3 performs the second time of down-sampling to the feature map outputted by the second encoding hierarchy a2, and the first convolution block in the third encoding hierarchy a3 performs feature fusion of the feature map obtained by the second time of down-sampling and the sixth feature map outputted by the encoding module CM-N-1, and performs feature extraction to the result of the fusion, to obtain a ninth feature map.

The plurality of feature maps outputted by the encoding network include the feature maps obtained from processing by using the encoding hierarchies of the N-th encoding module of the N encoding modules.

Correspondingly, the step of performing, by the decoding network in the convolutional neural network, up-sampling and feature extraction to the feature maps, to output the predicted image corresponding to the blurred image may include:

by the first decoding hierarchy of the M decoding hierarchies, performing feature extraction to a feature map obtained from processing by using the M-th encoding hierarchy of the N-th encoding module, and performing up-sampling to a feature map obtained by the extraction;

by the decoding network, fusing a feature map obtained from processing by using the (u−1)-th decoding hierarchy of the M decoding hierarchies and a feature map obtained from processing by using the (M−u+1)-th encoding hierarchy of the N-th encoding module, to obtain a first fused feature map, wherein u is greater than or equal to 2, and less than or equal to M−1, and the value of M may be greater than or equal to 3;

by the decoding network, inputting the first fused feature map into the u-th decoding hierarchy of the M decoding hierarchies, and sequentially performing, by the u-th decoding hierarchy, feature extraction and up-sampling to the first fused feature map;

by the decoding network, fusing a feature map obtained from processing by using the (M−1)-th decoding hierarchy of the M decoding hierarchies and a feature map obtained from processing by using the first encoding hierarchy of the N-th encoding module, to obtain a second fused feature map; and by the decoding network, inputting the second fused feature map into the M-th decoding hierarchy of the M decoding hierarchies, and performing, by the M-th decoding hierarchy, feature extraction to the second fused feature map, to obtain the predicted image.

In a particular implementation, the step of fusing the feature map obtained from processing by using the (u−1)-th decoding hierarchy of the M decoding hierarchies and the feature map obtained from processing by using the (M−u+1)-th encoding hierarchy of the N-th encoding module, to obtain the first fused feature map may include: splicing in a channel dimension the feature map obtained from processing by using the (u−1)-th decoding hierarchy of the M decoding hierarchies and the feature map obtained from processing by using the (M−u+1)-th encoding hierarchy of the N-th encoding module, to obtain the first fused feature map.

The step of fusing the feature map obtained from processing by using the (M−1)-th decoding hierarchy of the M decoding hierarchies and the feature map obtained from processing by using the first encoding hierarchy of the N-th encoding module, to obtain the second fused feature map may include: splicing in a channel dimension the feature map obtained from processing by using the (M−1)-th decoding hierarchy of the M decoding hierarchies and the feature map obtained from processing by using the first encoding hierarchy of the N-th encoding module, to obtain the second fused feature map.

As stated above, in the N-th encoding module CM-N, the first encoding hierarchy a1 outputs the seventh feature map, the second encoding hierarchy a2 outputs the eighth feature map, and the third encoding hierarchy a3 outputs the ninth feature map.

As shown in FIG. 8, in the decoding network, the second convolution block in the first decoding hierarchy b1 performs feature extraction to the ninth feature map, and the up-sampling block in the first decoding hierarchy b1 performs the first time of up-sampling to the result of the feature extraction. The decoding network performs the first time of fusion of the feature map outputted by the first decoding hierarchy b1 and the eighth feature map, and inputs the feature map obtained by the first time of fusion into the second decoding hierarchy b2. The second convolution block in the second decoding hierarchy b2 performs feature extraction to the feature map obtained by the first time of fusion, and the up-sampling block in the second decoding hierarchy b2 performs the second time of up-sampling to the result of the feature extraction. The decoding network performs the second time of fusion of the feature map outputted by the second decoding hierarchy b2 and the seventh feature map, and inputs the feature map obtained by the second time of fusion into the third decoding hierarchy b3. The second convolution block in the third decoding hierarchy b3 performs feature extraction to the feature map obtained by the second time of fusion, and outputs the predicted image.

Figure 9:
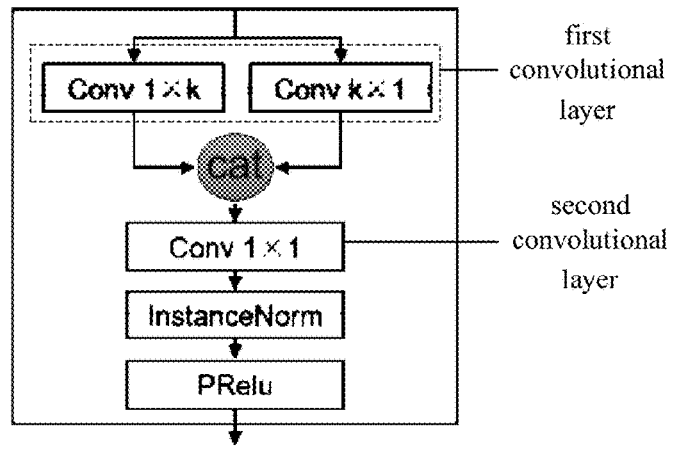
FIG. 9 schematically shows a schematic structural diagram of a first convolution block.

Referring to FIG. 9, FIG. 9 shows a schematic structural diagram of a first convolution block. As shown in FIG. 9, the first convolution block may include a first convolutional layer and a second convolutional layer, the first convolutional layer may include the asymmetrical convolution kernels, and the second convolutional layer may include a 1×1 convolution kernel.

In the first convolution block, the method may include using a splicing layer (for example, the cat shown in FIG. 9) to fuse the feature maps obtained from processing by using a pair of asymmetrical convolution kernels in the first convolutional layer, and subsequently using the second convolutional layer to perform channel-quantity compression to the result of the fusion, to reduce the calculation amount; subsequently, by an InstanceNorm layer, by using an InstanceNorm method, performing normalization processing to the result outputted by the second convolutional layer; subsequently, by a PRelu layer, by using an activation function PRelu, processing the inputted feature map; and, after the processing by the activation function, outputting the first convolution block.

The structure of the second convolution block may be the same as that of the first convolution block, and certainly may also be different.

Figure 10:
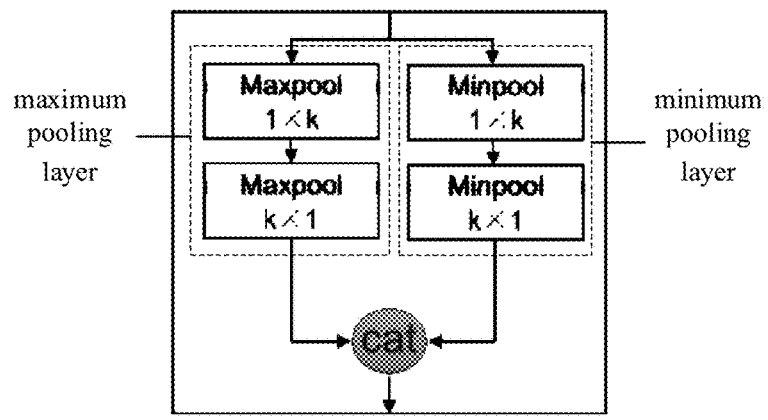
FIG. 10 schematically shows a schematic structural diagram of a down-sampling block.

Referring to FIG. 10, FIG. 10 shows a schematic structural diagram of a down-sampling block. As shown in FIG. 10, the down-sampling block may include a maximum pooling layer and a minimum pooling layer, and each of the maximum pooling layer and the minimum pooling layer includes a group of the asymmetrical convolution kernels. In other words, the down-sampling block includes a maximum pooling layer and a minimum pooling layer that are spatially separable, and the filtering kernel dimensions of the maximum pooling layer and the minimum pooling layer may be set to be k=5. The asymmetrical convolution kernels included in the maximum pooling layer and the minimum pooling layer may be the same or different.

In the down-sampling block, a splicing layer (for example, the cat shown in FIG. 10) may be configured to fuse the feature map outputted by the maximum pooling layer and the feature map outputted by the minimum pooling layer, and after the fusion the down-sampling block is outputted.

The up-sampling block is configured to perform up-sampling operations. The up-sampling operations may particularly include: PixelShuffle, maximum-value combination, stride transposed convolution, interpolation (for example, interpolation and twice cubic interpolation) and so on. However, that is not limited in the present disclosure.

As shown in FIG. 8, the convolutional neural network is of a shape of crossed grid, which may enhance the fusion between the deep-layer features and the shallow-layer features, sufficiently utilize the limited fingerprint data in the original image, and increase the accuracy of the extraction of the sharp image from the original image.

In the present implementation, the convolutional neural network uses the spatially separable convolution to perform most of the convolution operations. By using the spatially separable convolution to perform feature extraction or sampling processing, the calculation amount may be greatly reduced, thereby increasing the processing speed, which facilitates to realize real-time processing of the inputted image. Furthermore, the spatially separable convolution can learn the transverse gradient and the longitudinal gradient in the blurred image, which facilitates to extract the changing of the data in the fingerprint image, and increase the accuracy of the extraction of the sharp image from the blurred image.

In another alternative implementation, all of the convolution kernels in the encoding hierarchies and the decoding hierarchies are symmetrical convolution kernels.

In the present implementation, the encoding network may include P encoding hierarchies. The encoding network shown in FIG. 11 includes 3 encoding hierarchies, which are the first encoding hierarchy, the second encoding hierarchy and the third encoding hierarchy.

Figure 11:
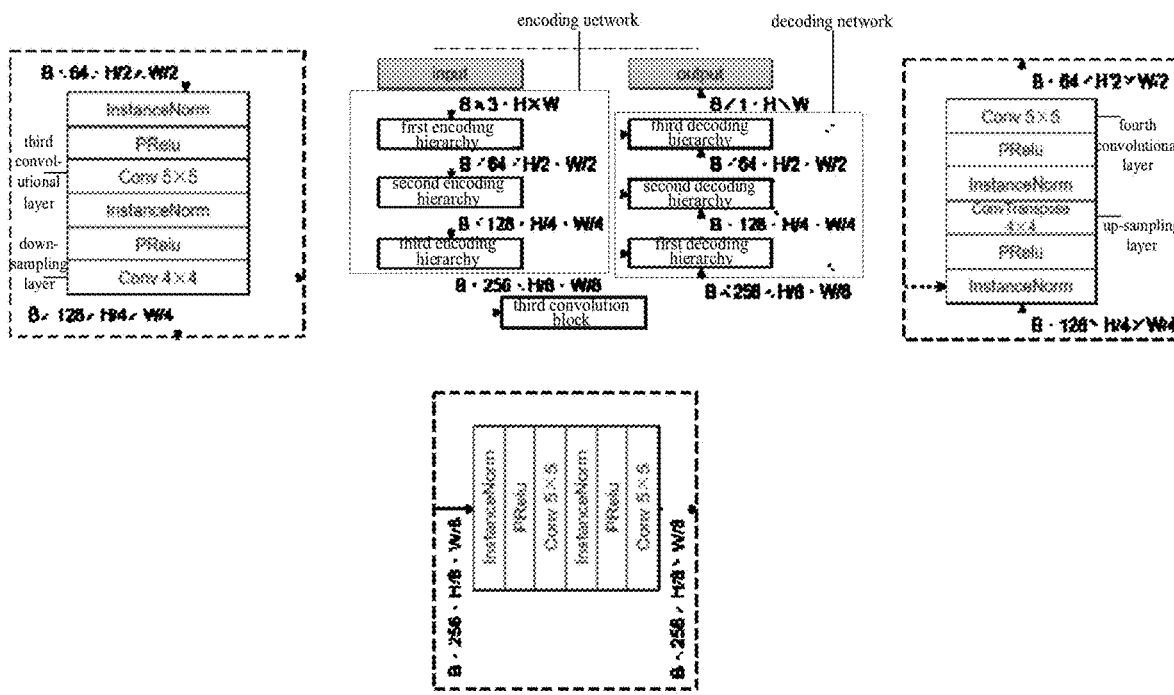
FIG. 11 schematically shows a schematic structural diagram of a second type of a convolutional neural network.

The particular structure of the second encoding hierarchy is within the dotted-line block on the left of the second encoding hierarchy in FIG. 11. The second encoding hierarchy may particularly include: an InstanceNorm layer, a PRelu layer, a third convolutional layer, an InstanceNorm layer, a PRelu layer and a down-sampling layer.

The InstanceNorm layer performs normalization processing to the inputted feature map by using an InstanceNorm method.

The PRelu layer processes the inputted feature map by using an activation function PRelu.

The third convolutional layer may include 5×5 convolution kernels, and is configured to perform feature extraction to the inputted feature map.

The down-sampling layer may include a convolutional layer of 4×4 convolution kernels. The stride of the convolutional layer may be 2, and, therefore, the width and the height of the feature map outputted by the second encoding hierarchy are individually reduced 2 times as compared with the width and the height of the inputted feature map.

The particular structures of the first encoding hierarchy, the second encoding hierarchy and the third encoding hierarchy may be the same.

In the present implementation, the decoding network may include P decoding hierarchies; in other words, the quantity of the decoding hierarchies is equal to the quantity of the encoding hierarchies. The decoding network shown in FIG. 11 includes 3 decoding hierarchies, which are the first decoding hierarchy, the second decoding hierarchy and the third decoding hierarchy.

The particular structure of the second decoding hierarchy is within the dotted-line block on the right of the second decoding hierarchy in FIG. 11. The second decoding hierarchy may particularly include: an InstanceNorm layer, a PRelu layer, an up-sampling layer, an InstanceNorm layer, a PRelu layer and a fourth convolutional layer.

The InstanceNorm layer performs normalization processing to the inputted feature map by using an InstanceNorm method. The PRelu layer processes the inputted feature map by using an activation function PRelu.

The up-sampling layer may include a convolutional layer of 4×4 transposed convolution kernels. The stride of the convolutional layer may be 2, and, therefore, the width and the height of the feature map outputted by the second decoding hierarchy are individually increased 2 times as compared with the width and the height of the inputted feature map.

The fourth convolutional layer may include 5×5 convolution kernels, and is configured to perform feature extraction to the inputted feature map.

The particular structures of the first decoding hierarchy, the second decoding hierarchy and the third decoding hierarchy may be the same.

In the present implementation, the step of performing, by the encoding network in the convolutional neural network, down-sampling and feature extraction to the blurred image, to output the plurality of feature maps may include:

sequentially performing, by the first encoding hierarchy of the P encoding hierarchies, feature extraction and down-sampling to the blurred image; and sequentially performing, by the q-th encoding hierarchy of the P encoding hierarchies, feature extraction and down-sampling to a feature map obtained from processing by using the (q−1)-th encoding hierarchy;

wherein q is greater than or equal to 2, and less than or equal to P, and the plurality of feature maps outputted by the encoding network include the feature maps obtained from processing by using the P encoding hierarchies.

In a particular implementation, the first encoding hierarchy sequentially performs feature extraction and down-sampling to the blurred image, to obtain a tenth feature map. The second encoding hierarchy sequentially performs feature extraction and down-sampling to the tenth feature map, to obtain an eleventh feature map. The third encoding hierarchy sequentially performs feature extraction and down-sampling to the eleventh feature map, to obtain a twelfth feature map.

The matrix dimension corresponding to the blurred image is B×3×H×W, wherein B is the quantity of the original images in one training batch, H is the height of one original image, and W is the width of one original image. The matrix dimension corresponding to the tenth feature map is B×64×H/2×W/2, the matrix dimension corresponding to the eleventh feature map is B×128×H/4×W/4, and the matrix dimension corresponding to the twelfth feature map is B×256×H/8×W/8.

The decoding network may further include a third convolution block, which includes an InstanceNorm layer, a PRelu layer, a convolutional layer of 5×5 convolution kernels, an InstanceNorm layer, a PRelu layer and a convolutional layer of 5×5 convolution kernels. The width dimensions and the height dimensions of the characteristic matrixes that are inputted into and outputted from the third convolution block maintain unchanged.

In the present implementation, the step of performing, by the decoding network in the convolutional neural network, up-sampling and feature extraction to the feature maps, to output the predicted image corresponding to the blurred image may include:

by the third convolution block, performing feature extraction to a feature map obtained from processing by using the P-th encoding hierarchy of the P encoding hierarchies, to obtain a calculation feature map;

by the decoding network, fusing the calculation feature map and the feature map obtained from processing by using the P-th encoding hierarchy, to obtain a third fused feature map;

by the decoding network, inputting the third fused feature map into the first decoding hierarchy of the P decoding hierarchies, and sequentially performing, by the first decoding hierarchy, up-sampling and feature extraction to the third fused feature map;

by the decoding network, fusing a feature map obtained from processing by using the (r−1)-th decoding hierarchy of the P decoding hierarchies and a feature map obtained from processing by using the (P−r+1)-th encoding hierarchy of the P encoding hierarchies, to obtain a fourth fused feature map; and by the decoding network, inputting the fourth fused feature map into the r-th decoding hierarchy of the P decoding hierarchies, and sequentially performing, by the r-th decoding hierarchy, up-sampling and feature extraction to the fourth fused feature map;

wherein r is greater than or equal to 2, and less than or equal to P, and the predicted image is a feature map obtained from processing by using the P-th decoding hierarchy of the P decoding hierarchies.

The step of fusing the calculation feature map and the feature map obtained from processing by using the P-th encoding hierarchy, to obtain the third fused feature map may include: splicing in a channel dimension the calculation feature map and the feature map obtained from processing by using the P-th encoding hierarchy, to obtain the third fused feature map.

The step of fusing the feature map obtained from processing by using the (r−1)-th decoding hierarchy of the P decoding hierarchies and the feature map obtained from processing by using the (P−r+1)-th encoding hierarchy of the P encoding hierarchies, to obtain the fourth fused feature map may include: splicing in a channel dimension the feature map obtained from processing by using the (r−1)-th decoding hierarchy of the P decoding hierarchies and the feature map obtained from processing by using the (P−r+1)-th encoding hierarchy of the P encoding hierarchies, to obtain the fourth fused feature map.

In a particular implementation, referring to FIG. 8, the third convolution block performs feature extraction to the twelfth feature map, to obtain the calculation feature map, and the decoding network fuses the calculation feature map and the twelfth feature map, to obtain the third fused feature map. The third fused feature map is used as the input of the first decoding hierarchy, and the first decoding hierarchy sequentially performs up-sampling and feature extraction to the third fused feature map, to obtain a thirteenth feature map. The decoding network fuses the thirteenth feature map and the eleventh feature map, to obtain a fourteenth feature map, and inputs the fourteenth feature map into the second decoding hierarchy. The second decoding hierarchy sequentially performs up-sampling and feature extraction to the fourteenth feature map, to obtain a fifteenth feature map. The decoding network fuses the fifteenth feature map and the tenth feature map, to obtain a sixteenth feature map, and inputs the sixteenth feature map into the third decoding hierarchy. The third decoding hierarchy sequentially performs up-sampling and feature extraction to the sixteenth feature map, to obtain the predicted image.

Figure 12:
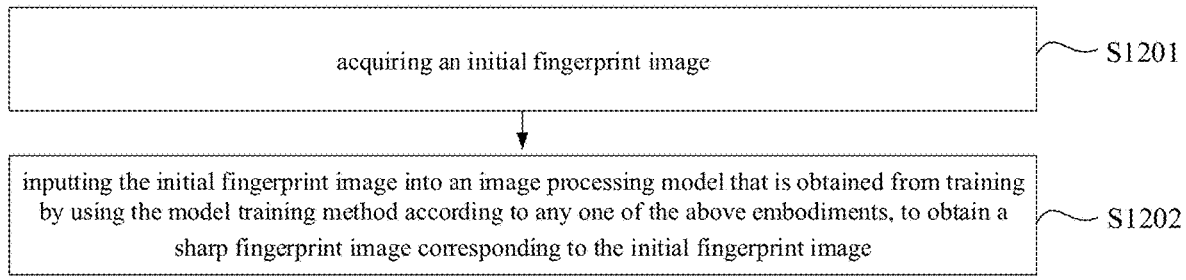
FIG. 12 schematically shows a schematic flow chart of an image processing method.

FIG. 12 schematically shows a flow chart of an image processing method. As shown in FIG. 12, the method may include the following steps.

Step S1201: acquiring a blurred fingerprint image.

If the blurred image used in the model training is the result of the pre-processing to the original image, the step of acquiring the blurred fingerprint image includes: acquiring an original fingerprint image; and pre-processing the original fingerprint image, to obtain the blurred fingerprint image, wherein the pre-processing includes at least one of image segmentation, size cutting, flipping, brightness enhancement, noise processing and normalization processing.

The process of acquiring the original fingerprint image is the same as the process of acquiring the original image, and the process of pre-processing the original fingerprint image is the same as the process of pre-processing the original image, which are not discussed herein further.

The subject of the implementation of the present embodiment may be a computer device. The computer device has an image processing apparatus which is used to implement the image processing method according to the present embodiment. The computer device may, for example, be a smartphone, a tablet personal computer and a personal computer, which is not limited in the present embodiment.

The subject of the implementation of the present embodiment may acquire the blurred fingerprint image in various manners. For example, the subject of the implementation may acquire an original fingerprint image collected by a multi-pointolite under-screen fingerprint collecting device, and subsequently pre-process the acquired original fingerprint image, to obtain the blurred fingerprint image.

Step S1202: inputting the blurred fingerprint image into an image processing model that is obtained by training by using the model training method according to any one of the above embodiments, to obtain a sharp fingerprint image corresponding to the blurred fingerprint image.

The image processing model may be completely trained in advance, and may also be obtained by training during the process of the image processing, which is not limited in the present embodiment.

The image processing method according to the present embodiment, by inputting the blurred fingerprint image into the image processing model, a high-quality sharp fingerprint image may be extracted, and the data of the fingerprint ridges and the fingerprint troughs of the fingerprint may be extracted and enhanced, and the sharp fingerprint image can be directly applied to fingerprint identification. As compared with the related art of sequentially lightening the pointolites to acquire a sharp fingerprint image, the present embodiment can increase the efficiency of the acquirement of the sharp fingerprint image.

Figure 13:
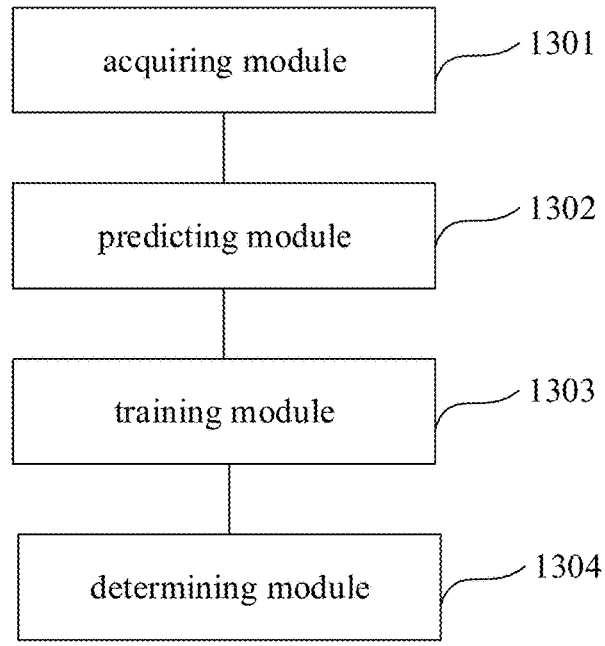
FIG. 13 schematically shows a structural block diagram of a model training apparatus.

FIG. 13 schematically shows a block diagram of a model training apparatus. Referring to FIG. 13, the apparatus may include:

an acquiring module 1301 configured for acquiring a sample set, wherein samples in the sample set include a blurred image and a sharp image of a same fingerprint;

a predicting module 1302 configured for inputting the blurred image into a convolutional neural network, performing, by an encoding network in the convolutional neural network, down-sampling and feature extraction to the blurred image, to output a plurality of feature maps, and performing, by a decoding network in the convolutional neural network, up-sampling and feature extraction to the feature maps, to output a predicted image corresponding to the blurred image, wherein the encoding network includes a plurality of encoding hierarchies, the decoding network includes a plurality of decoding hierarchies, a feature map obtained from processing by using an F-th encoding hierarchy in the encoding network and a feature map obtained from processing by using a G-th decoding hierarchy in the decoding network are fused as an input of a (G+1)-th decoding hierarchy in the decoding network, a resolution of the feature map obtained from processing by using the F-th encoding hierarchy is the same as a resolution of the feature map obtained from processing by using the G-th decoding hierarchy, and both of F and G are a positive integer;

a training module 1303 configured for, according to the predicted image, the sharp image and a predetermined loss function, calculating a loss value of the convolutional neural network, and, with minimizing the loss value as a target, adjusting parameters of the convolutional neural network; and a determining module 1304 configured for determining the convolutional neural network of which the parameters are adjusted to be an image processing model.

The particular modes of the operations performed by the modules of the apparatus according to the above embodiment have already been described in detail in the embodiments of the model training method, for example, implemented in the form of software, hardware, firmware and so on, and will not be explained and described in detail herein.

Figure 14:
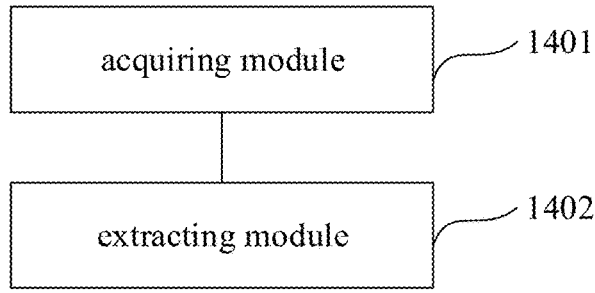
FIG. 14 schematically shows a structural block diagram of an image processing apparatus.

FIG. 14 schematically shows a block diagram of an image processing apparatus. Referring to FIG. 14, the apparatus may include:

an acquiring module 1401 configured for acquiring a blurred fingerprint image; and an extracting module 1402 configured for inputting the blurred fingerprint image into an image processing model that is obtained by training by using the model training method according to any one of the above embodiments, to obtain a sharp fingerprint image corresponding to the blurred fingerprint image.

The particular modes of the operations performed by the modules of the apparatus according to the above embodiment have already been described in detail in the embodiments of the image processing method, for example, implemented in the form of software, hardware, firmware and so on, and will not be explained and described in detail herein.

The above-described device embodiments are merely illustrative, wherein the units that are described as separate components may or may not be physically separate, and the components that are displayed as units may or may not be physical units; in other words, they may be located at the same location, and may also be distributed to a plurality of network units. Some or all of the modules may be selected according to the actual demands to realize the purposes of the solutions of the embodiments. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the computing and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 15:
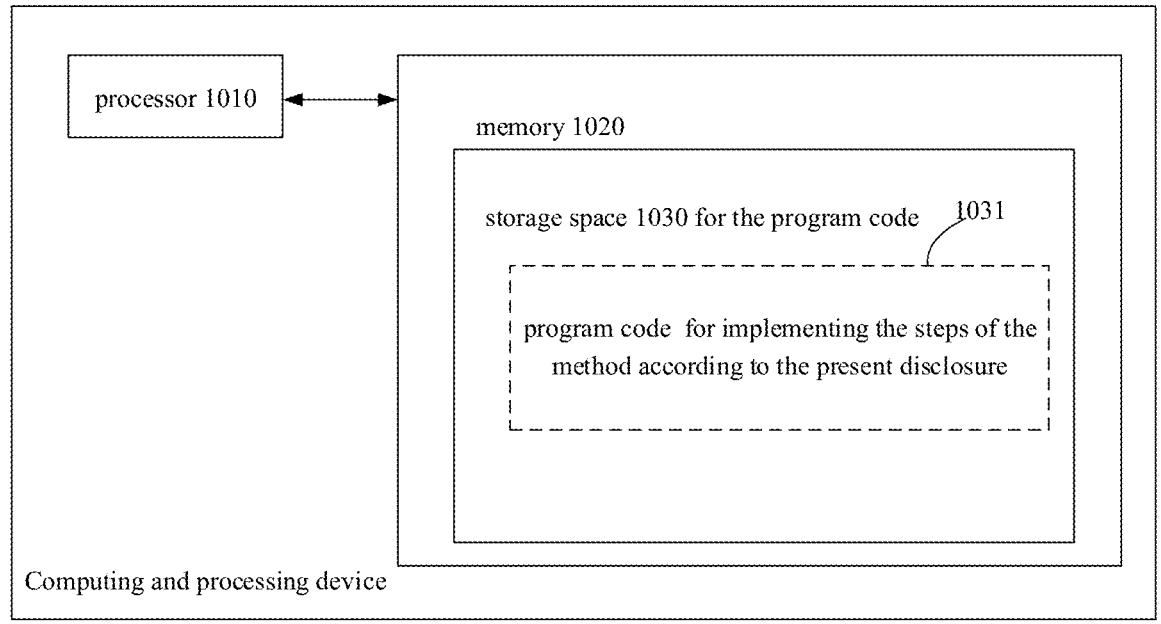
FIG. 15 schematically shows a block diagram of a computing and processing device for implementing the method according to the present disclosure.
Figure 16:
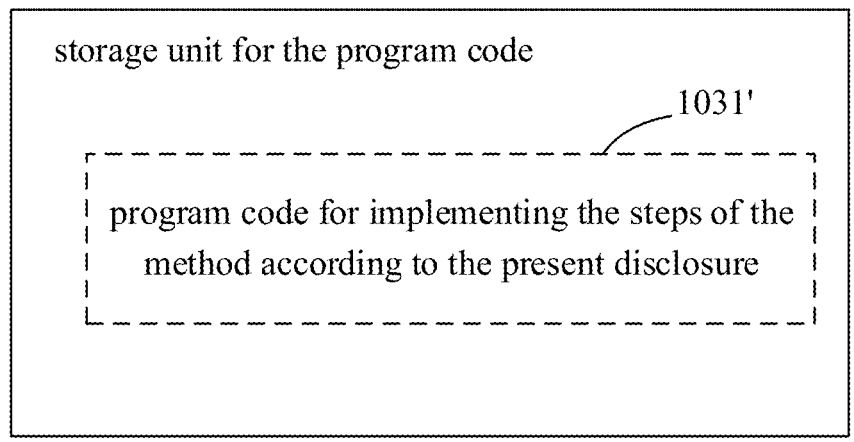
FIG. 16 schematically shows a storage unit for maintaining or carrying a program code for implementing the method according to the present disclosure.

For example, FIG. 15 shows a computing and processing device that can implement the method according to the present disclosure. The computing and processing device traditionally includes a processor 1010 and a computer program product or non-transient computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 16. The storage unit may have storage segments or storage spaces with similar arrangement to the memory 1020 of the computing and processing device in FIG. 15. The program codes may, for example, be compressed in a suitable form. Generally, the storage unit contains a computer-readable code 1031', which can be read by a processor like 1010. When those codes are executed by the computing and processing device, the codes cause the computing and processing device to implement each of the steps of the method described above.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "include" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

A model training method, an image processing method, a computing and processing device and a non-transient computer-readable medium according to the present disclosure is described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

It should be understood that, although the steps in the flow charts in the drawings are shown sequentially according to the indication by the arrows, those steps are not necessarily performed sequentially according to the sequence indicated by the arrows. Unless expressly described herein, the sequence of the performances of those steps are not strictly limited, and they may be performed in other sequences. Furthermore, at least some of the steps in the flow charts in the drawings may include a plurality of sub-steps or a plurality of stages, wherein those sub-steps or stages are not necessarily completely performed at the same moment, but may be performed at different moments, and their performance sequence is not necessarily sequential performance, but may be performance alternate with at least some of the other steps or the sub-steps or stages of the other steps.

A person skilled in the art, after considering the description and implementing the invention disclosed herein, will readily envisage other embodiments of the present disclosure. The present disclosure aims at encompassing any variations, uses or adaptative alternations of the present disclosure, wherein those variations, uses or adaptative alternations follow the general principle of the present disclosure and include common knowledge or common technical means in the art that are not disclosed by the present disclosure. The description and the embodiments are merely deemed as exemplary, and the true scope and spirit of the present disclosure are presented by the following claims.

It should be understood that the present disclosure is not limited to the accurate structure that has been described above and shown in the drawings, and may have various modifications and variations without departing from its scope. The scope of the present disclosure is merely limited by the appended claims.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. An image processing method comprising:
acquiring a blurred fingerprint image; and
inputting the blurred fingerprint image into an image processing model, to obtain a sharp fingerprint image corresponding to the blurred fingerprint image,
wherein the image processing model is obtained from training by using operations comprising:
acquiring a sample set, wherein samples in the sample set include a blurred image and a sharp image of a same fingerprint;
inputting the blurred image into a convolutional neural network, performing, by an encoding network in the convolutional neural network, down-sampling and feature extraction to the blurred image, to output a plurality of feature maps, and performing, by a decoding network in the convolutional neural network, up-sampling and feature extraction to the feature maps, to output a predicted image corresponding to the blurred image, wherein the encoding network comprises a plurality of encoding hierarchies, the decoding network comprises a plurality of decoding hierarchies, a feature map obtained from processing by using an F-th encoding hierarchy in the encoding network and a feature map obtained from processing by using a G-th decoding hierarchy in the decoding network are fused as an input of a (G+1)-th decoding hierarchy in the decoding network, a resolution of the feature map obtained from processing by using the F-th encoding hierarchy is the same as a resolution of the feature map obtained from processing by using the G-th decoding hierarchy, and both of F and G are a positive integer;
according to the predicted image, the sharp image and a predetermined loss function, calculating a loss value of the convolutional neural network, and, with minimizing the loss value as a target, adjusting parameters of the convolutional neural network; and
determining the convolutional neural network of which the parameters are adjusted to be an image processing model,
wherein each of the encoding hierarchies comprises a first convolution block and/or a down-sampling block, and each of the decoding hierarchies comprises a second convolution block and/or an up-sampling block, and
wherein at least one of the first convolution block, the down-sampling block, the second convolution block and the up-sampling block comprises at least one group of asymmetrical convolution kernels.

2. The image processing method according to claim 1, wherein on the condition that the blurred image is a result of pre-processing to the original image, the step of acquiring the blurred fingerprint image comprises:
acquiring an original fingerprint image; and
pre-processing the original fingerprint image, to obtain the blurred fingerprint image, wherein the pre-processing includes at least one of image segmentation, size cutting, flipping, brightness enhancement, noise processing and normalization processing.

3. A computing and processing device, wherein the computing and processing device comprises:
a memory storing a computer-readable code; and
one or more processors, wherein when the computer-readable code is executed by the one or more processors, the computing and processing device implements the method according to claim 1.

4. A non-transient computer-readable medium, wherein the non-transient computer-readable medium stores a computer-readable code, and when the computer-readable code is executed in a computing and processing device, the computer-readable code causes the computing and processing device to implement the method according to claim 1.

5. The image processing method according to claim 1, wherein the encoding network comprises N encoding modules, each of the encoding modules comprises M encoding hierarchies, both of M and N are a positive integer, and the operation of performing, by the encoding network in the convolutional neural network, down-sampling and feature extraction to the blurred image, to output the plurality of feature maps comprises:
performing, by a first encoding hierarchy of a first encoding module of the N encoding modules, feature extraction to the blurred image;
sequentially performing, by an i-th encoding hierarchy of the first encoding module, down-sampling and feature extraction to a feature map obtained from processing by using an (i−1)-th encoding hierarchy of the first encoding module, wherein i is greater than or equal to 2, and less than or equal to M;
performing, by a first encoding hierarchy of a j-th encoding module of the N encoding modules, feature extraction to a feature map obtained from processing by using a first encoding hierarchy of a (j−1)-th encoding module, wherein j is greater than or equal to 2, and less than or equal to N; and
by an i-th encoding hierarchy of the j-th encoding module, performing down-sampling to a feature map obtained from processing by using an (i−1)-th encoding hierarchy of the j-th encoding module, fusing a feature map obtained by the down-sampling and a feature map obtained from processing by using an i-th encoding hierarchy of the (j−1)-th encoding module, and performing feature extraction to a result of a fusion,
wherein the plurality of feature maps include feature maps obtained from processing by using the encoding hierarchies of a N-th encoding module of the N encoding modules.

6. The image processing method according to claim 5, wherein the decoding network comprises M decoding hierarchies, and the operation of performing, by the decoding network in the convolutional neural network, up-sampling and feature extraction to the feature maps, to output the predicted image corresponding to the blurred image comprises:
by a first decoding hierarchy of the M decoding hierarchies, performing feature extraction to a feature map obtained from processing by using an M-th encoding hierarchy of the N-th encoding module, and performing up-sampling to a feature map obtained by the extraction;
fusing a feature map obtained from processing by using a (u−1)-th decoding hierarchy of the M decoding hierarchies and a feature map obtained from processing by using an (M−u+1)-th encoding hierarchy of the N-th encoding module, to obtain a first fused feature map, wherein u is greater than or equal to 2, and less than or equal to M−1;
inputting the first fused feature map into a u-th decoding hierarchy of the M decoding hierarchies, and sequentially performing, by the u-th decoding hierarchy, feature extraction and up-sampling to the first fused feature map;
fusing a feature map obtained from processing by using an (M−1)-th decoding hierarchy of the M decoding hierarchies and a feature map obtained from processing by using the first encoding hierarchy of the N-th encoding module, to obtain a second fused feature map; and inputting the second fused feature map into an M-th decoding hierarchy of the M decoding hierarchies, and performing, by the M-th decoding hierarchy, feature extraction to the second fused feature map, to obtain the predicted image.

7. The image processing method according to claim 6, wherein the operation of fusing the feature map obtained by the down-sampling and the feature map obtained from processing by using the i-th encoding hierarchy of the (j−1)-th encoding module, and performing feature extraction to the result of the fusion comprises:

splicing, in a channel dimension, the feature map obtained by the down-sampling and the feature map obtained from processing by using the i-th encoding hierarchy of the (j−1)-th encoding module, and performing feature extraction to a result of the splicing;

the operation of fusing the feature map obtained from processing by using the (u−1)-th decoding hierarchy of the M decoding hierarchies and the feature map obtained from processing by using the (M−u+1)-th encoding hierarchy of the N-th encoding module, to obtain the first fused feature map comprises:

splicing, in the channel dimension, the feature map obtained from processing by using the (u−1)-th decoding hierarchy of the M decoding hierarchies and the feature map obtained from processing by using the (M−u+1)-th encoding hierarchy of the N-th encoding module, to obtain the first fused feature map; and the operation of fusing the feature map obtained from processing by using the (M−1)-th decoding hierarchy of the M decoding hierarchies and the feature map obtained from processing by using the first encoding hierarchy of the N-th encoding module, to obtain the second fused feature map comprises:

splicing, in the channel dimension, the feature map obtained from processing by using the (M−1)-th decoding hierarchy of the M decoding hierarchies and the feature map obtained from processing by using the first encoding hierarchy of the N-th encoding module, to obtain the second fused feature map.

8. The image processing method according to claim 1, wherein each of the first convolution block and the second convolution block comprises a first convolutional layer and a second convolutional layer, the first convolutional layer comprises the asymmetrical convolution kernels, and the second convolutional layer comprises a 1×1 convolution kernel, the down-sampling block comprises a maximum pooling layer and a minimum pooling layer, and each of the maximum pooling layer and the minimum pooling layer comprises the asymmetrical convolution kernels, and the asymmetrical convolution kernels include 1×k convolution kernels and k×1 convolution kernels, wherein k is greater than or equal to 2.

9. The image processing method according to claim 1, wherein each of the first convolution block and the second convolution block comprises a first convolutional layer and a second convolutional layer, the first convolutional layer comprises the asymmetrical convolution kernels, and the second convolutional layer comprises a 1×1 convolution kernel, the down-sampling block comprises a maximum pooling layer and a minimum pooling layer, and each of the maximum pooling layer and the minimum pooling layer comprises the asymmetrical convolution kernels, and the asymmetrical convolution kernels include 1×k convolution kernels and k×1 convolution kernels, wherein k is greater than or equal to 2.

10. An image processing method comprising:
acquiring a blurred fingerprint image; and
inputting the blurred fingerprint image into an image processing model, to obtain a sharp fingerprint image corresponding to the blurred fingerprint image,
wherein the image processing model is obtained from training by using operations comprising:
acquiring a sample set, wherein samples in the sample set include a blurred image and a sharp image of a same fingerprint;
inputting the blurred image into a convolutional neural network, performing, by an encoding network in the convolutional neural network, down-sampling and feature extraction to the blurred image, to output a plurality of feature maps, and performing, by a decoding network in the convolutional neural network, up-sampling and feature extraction to the feature maps, to output a predicted image corresponding to the blurred image, wherein the encoding network comprises a plurality of encoding hierarchies, the decoding network comprises a plurality of decoding hierarchies, a feature map obtained from processing by using an F-th encoding hierarchy in the encoding network and a feature map obtained from processing by using a G-th decoding hierarchy in the decoding network are fused as an input of a (G+1)-th decoding hierarchy in the decoding network, a resolution of the feature map obtained from processing by using the F-th encoding hierarchy is the same as a resolution of the feature map obtained from processing by using the G-th decoding hierarchy, and both of F and G are a positive integer;
according to the predicted image, the sharp image and a predetermined loss function, calculating a loss value of the convolutional neural network, and, with minimizing the loss value as a target, adjusting parameters of the convolutional neural network; and
determining the convolutional neural network of which the parameters are adjusted to be an image processing model,
wherein the operation of, according to the predicted image, the sharp image and the predetermined loss function, calculating the loss value of the convolutional neural network comprises:
calculating the loss value by using the following formulas:

$$L(Y, \hat{Y}) = L_{L1}(Y, \hat{Y}) + \lambda \times L_{sobel}(Y, \hat{Y}),$$

$$L_{L1}(Y, \hat{Y}) = \frac{1}{W \times H \times C} \sum_{x=1}^{W} \sum_{y=1}^{H} \sum_{z=1}^{C} |Y_{(x,y,z)} - \hat{Y}_{(x,y,z)}|,$$

$$L_{sobel}(Y, \hat{Y}) = L_{L1}(E(Y), E(\hat{Y})),$$

wherein $L(Y, \hat{Y})$ is the loss value, Y is the predicted image, $\hat{Y}$ is the sharp image, W is a width of the predicted image, H is a height of the predicted image, C is a channel quantity of the predicted image, E(Y) is an edge image of the predicted image, $E(\hat{Y})$ is an edge image of the sharp image, λ is greater than or equal to 0, and less than or equal to 1, x is a positive integer greater than or equal to 1 and less than or equal to W, y is a positive integer greater than or equal to 1 and less than or equal to H, and z is a positive integer greater than or equal to 1 and less than or equal to C.

11. An image processing method comprising:
acquiring a blurred fingerprint image; and
inputting the blurred fingerprint image into an image processing model, to obtain a sharp fingerprint image corresponding to the blurred fingerprint image,
wherein the image processing model is obtained from training by using operations comprising:
acquiring a sample set, wherein samples in the sample set include a blurred image and a sharp image of a same fingerprint;
inputting the blurred image into a convolutional neural network, performing, by an encoding network in the convolutional neural network, down-sampling and feature extraction to the blurred image, to output a plurality of feature maps, and performing, by a decoding network in the convolutional neural network, up-sampling and feature extraction to the feature maps, to output a predicted image corresponding to the blurred image, wherein the encoding network comprises a plurality of encoding hierarchies, the decoding network comprises a plurality of decoding hierarchies, a feature map obtained from processing by using an F-th encoding hierarchy in the encoding network and a feature map obtained from processing by using a G-th decoding hierarchy in the decoding network are fused as an input of a (G+1)-th decoding hierarchy in the decoding network, a resolution of the feature map obtained from processing by using the F-th encoding hierarchy is the same as a resolution of the feature map obtained from processing by using the G-th decoding hierarchy, and both of F and G are a positive integer;
according to the predicted image, the sharp image and a predetermined loss function, calculating a loss value of the convolutional neural network, and, with minimizing the loss value as a target, adjusting parameters of the convolutional neural network; and
determining the convolutional neural network of which the parameters are adjusted to be an image processing model,
wherein the operation of acquiring the sample set comprises:
acquiring an original image of the same fingerprint; and
pre-processing the original image, to obtain the blurred image, wherein the pre-processing includes at least one of image segmentation, size cutting, flipping, brightness enhancement, noise processing and normalization processing,
wherein the operation of pre-processing the original image, to obtain the blurred image comprises:
performing image segmentation to the original image, to obtain a first image, a second image and a third image, wherein the first image, the second image and the third image contain data of different regions of the original image; and
performing normalization processing individually to the first image, the second image and the third image, wherein the blurred image comprises the first image, the second image and the third image that are obtained after the normalization processing.

12. The image processing method according to claim 11, wherein the original image comprises a first pixel value of a first pixel, and the operation of performing image segmentation to the original image, to obtain the first image, the second image and the third image comprises:
if the first pixel is located outside a predetermined region area, and the first pixel value is greater than or equal to a first threshold, and less than or equal to a second threshold, determining a pixel value of the first pixel in the first image to be the first pixel value;
if the first pixel is located outside the predetermined region area, and the first pixel value is less than the first threshold, and greater than the second threshold, determining the pixel value of the first pixel in the first image to be 0;
if the first pixel is located outside the predetermined region area, and the first pixel value is greater than or equal to a third threshold, and less than or equal to a fourth threshold, determining a pixel value of the first pixel in the second image to be the first pixel value;
if the first pixel is located outside the predetermined region area, and the first pixel value is less than the third threshold, and greater than the fourth threshold, determining the pixel value of the first pixel in the second image to be 0; and
if the first pixel is located inside the predetermined region area, determining a pixel value of the first pixel in the third image to be the first pixel value,
wherein the third threshold is greater than the second threshold.

13. The image processing method according to claim 11, wherein the operation of performing image segmentation to the original image, to obtain the first image, the second image and the third image comprises:
performing edge detection to the original image, and according to a position and a length of a detected edge, segmenting the original image into the first image, the second image and the third image.

* * * * *